United States Patent Office 3,058,629
Patented Oct. 16, 1962

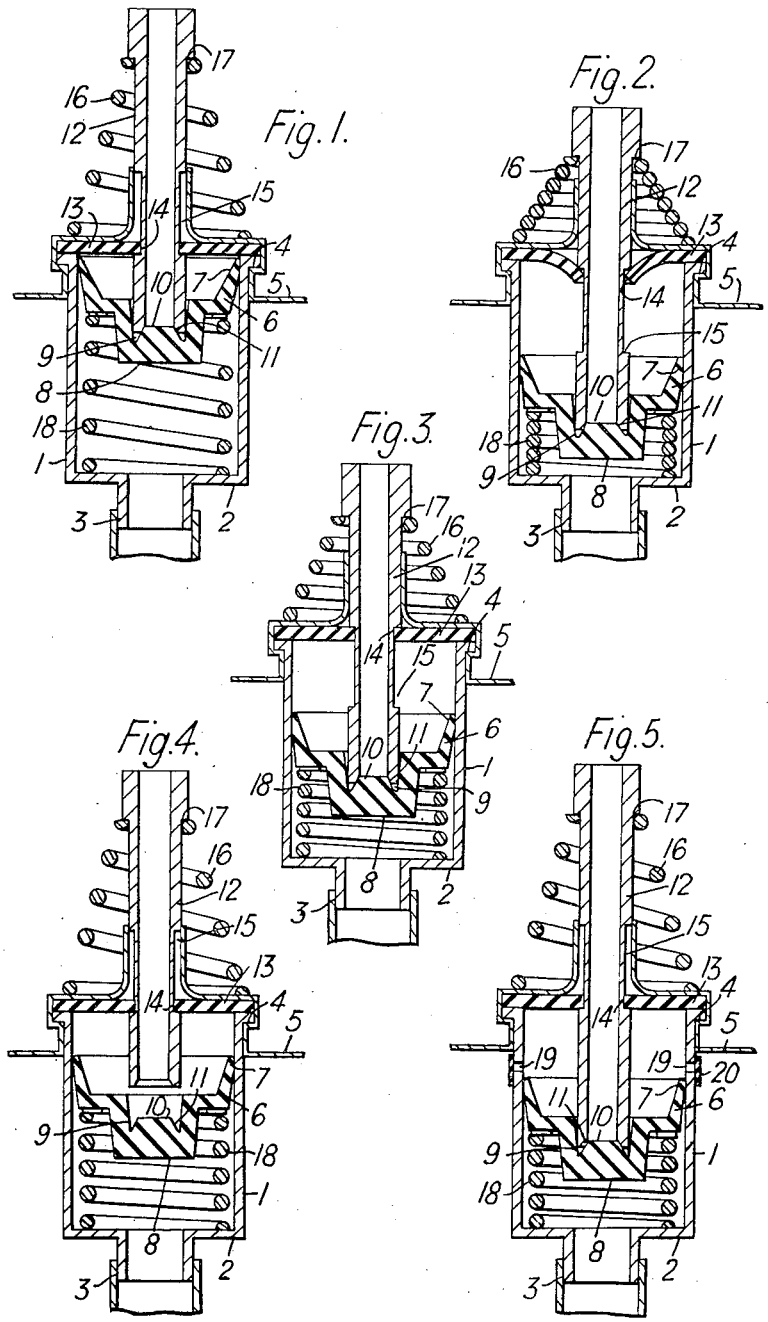

3,058,629
DISPENSING DEVICES FOR AEROSOLS
Alan Gawthrop, Birstall, Leicester, England, assignor to Neotechnic Engineering Limited, Clitheroe, England, a company of Great Britain
Filed Feb. 5, 1960, Ser. No. 7,001
Claims priority, application Great Britain Feb. 5, 1959
3 Claims. (Cl. 222—394)

This invention is for improvements in or relating to dispensing devices for aerosols and has for an object to provide a metering valve for delivering metered quantities of an aerosol composition.

Aerosol compositions generally are of two kinds, namely those in which the composition contains a propellant liquid, which vaporises very rapidly when the composition is at atmospheric pressure, and those in which the propulsion of the aerosol composition is effected by maintaining the liquid composition in a container under the pressure of a permanent gas, such as nitrogen.

The term "aerosol composition" as employed herein includes compositions other than simple liquids such as pastes, which may be discharged in the form of a coherent ribbon or stream, and viscous liquids which may be discharged in the form of a jet or a series of large drops and is not limited to compositions which are discharged in the form of the very minute droplets normally referred to as aerosols in the art to which the present invention relates.

Usually, the discharge tube will be provided with an actuator in the form of a nozzle member so constructed as to discharge the aerosol composition in the form of a jet, spray or ribbon and to provide a conveniently shaped end part to which manual pressure can be applied to operate the valve.

Various prior constructions have been proposed for the dispensing of metered quantities of aerosol compositions having a number of moving parts and co-operating valves and it is an object of the present invention to provide a simplified construction of dispensing device for the delivery of metered quantities, particularly for the dispensing of aerosol compositions of the type which are ejected by the use of the pressure of a permanent gas.

According to the present invention there is provided a dispensing device for delivering metered quantities of an aerosol composition which comprises a cylindrical chamber, adapted to be sealed into the neck of a container, closed at its outer end with respect to the container by a rubber or like elastic sealing washer and provided with an inlet at its inner end for communication with the interior of the container, a cup-shaped piston member formed with a sealing rim resiliently engageable with the wall of said cylindrical chamber and disposed to be axially reciprocable therein with its open end towards the outer end thereof, a discharge tube mounted in said sealing washer and extending therethrough to be engageable with the bottom of the piston member and to be sealed thereby, said discharge tube being resiliently biassed in an outward direction and being movable axially of the chamber so as first to depress the piston member to a predetermined extent to collect a metered quantity of liquid within the outer part of the cylindrical chamber and thereafter to return outwardly to its initial position whilst separating from sealing engagement with the piston member whereby the metered quantity of liquid is vented therethrough to atmosphere. Preferably, a compression spring is mounted within the chamber beneath the piston member so as to urge the piston member towards its outermost position when the discharge tube is in sealing engagement with the piston member and there is no pressure differential between the inner and outer parts of the cylindrical chamber.

A feature of the invention consists in that the discharge tube is formed on its outer surface with a circumferential recess whose length axially of the discharge tube is greater than the thickness of the sealing washer, to provide a lost-motion connection between the discharge tube and the sealing washer.

The inlet at the inner end of the cylindrical chamber is preferably provided with a dip-tube for extending to the bottom of the container when the aerosol container is to be used in the upright position, that is to say with the discharge tube upwards.

In order to facilitate the charging of the container with a permanently gaseous propellant, such as nitrogen, it is a further feature of the invention that the cylindrical member is formed with one or more orifices in the side wall thereof, and a resilient valving member, such as a surrounding strip of rubber, is disposed over the orifice or orifices to form a one-way valve or valves thus allowing the gaseous propellant to be charged into the container whilst preventing loss thereof after charging; the orifice or orifices may either be disposed at a position which is either above the uppermost position of or intermediate the extremes of movement of the sealing rim of the piston member.

The following is a description of embodiments of the invention with reference to the accompanying drawings in which:

FIGURES 1 to 4 are cross-sectional views of one form of dispensing device showing the parts in the various positions assumed during operation and FIGURE 5 is a cross-sectional view of another form of dispensing device adapted to be charged with a gaseous propellant.

A cylindrical member 1 is provided which at its lower end 2 is reduced in cross-section to provide a cylindrical extension 3 of smaller cross-section than that of the main part of the body of the cylindrical member. At its upper end the cylindrical member is formed with an outwardly extending flange 4 by which the cylindrical member 1 is secured, within the open neck of a container, by means of a closure 5.

Disposed within the cylindrical member is a cup-shaped piston member 6 with its open end disposed towards the open mouth of the cylindrical member 1. The cup-shaped piston member is formed of rubber with its sealing rim 7 resiliently engageable with the wall of the cylindrical member 1 and is slidably mounted so as to be axially reciprocable within the cylindrical member.

In the bottom wall 2 of the cup-shaped piston member 6 there is formed a recess 9 on the base of which is a frusto-conical projection 10, the recess and said projection being adapted to cooperate with the end 11 of a discharge tube 12 to provide a valving connection therewith.

On the open end of the cylindrical member 1 and in engagement with the outwardly extending flange 4 there is disposed a resilient sealing washer 13 which is firmly clamped into position when sealed into the neck of the container by the closure 5 so as to provide a gas- and liquid-tight seal on the open end of the cylindrical member 1.

Extending through a hole 14 formed in the resilient washer 13 is a discharge tube 12, the end 11 of which, lying within the chamber, is adapted to co-operate with the recess 9 and projection 10 on the base 8 of the cup-shaped piston member 6 above referred to. Over a part of its outer surface the discharge tube 12 is formed with a circumferential recess 15 of a greater axial length than the thickness of the sealing washer 13 so as to allow of relative movement between the discharge tube 12 and the sealing washer 13 on axial movement of the discharge tube. A spring 16 is disposed between an abutment 17 formed near to the outer end of the discharge tube 12 and the surface of the closure 5 lying over the sealing washer 13 so as to bias the discharge tube 12 in an outward direction.

A spring 18 is also mounted within the cylindrical member 1 beneath the cup-shaped piston member 6 so as also to exercise a bias on the said piston member in a direction towards its open end.

In the operation of the device it is, of course, sealed into the neck of a container charged with an aerosol composition under pressure and if used in the upright position, i.e. with the neck of the container uppermost, a dip-tube is connected to the cylindrical extension 3 of the cylindrical member 1 so as to provide a feed for the aerosol material up into the cylindrical member.

The cylindrical member 1 constitutes a metering chamber and operates as follows.

Due to the bias on the discharge tube 12 and on the cup-shaped piston member 6, both are normally disposed at the outermost position as shown in FIGURE 1. On depression of the discharge tube 12 it moves the cup-shaped piston member 6 downwardly in the cylindrical metering chamber 1, the resiliency of its sealing rim 7 allowing liquid to pass around the rim and into the part of the chamber 1 above it. The discharge tube 12 moves towards the limit of its travel and throughout the whole of this time is in sealing engagement with the recess 9 and projection 10 in the base 8 of the cup-shaped piston member 6 as shown in FIGURE 2.

On release of pressure on the discharge tube 12, it moves under the influence of its spring 16 in an outward direction to a position shown in FIGURE 3 thereafter moving out of sealing engagement with the base 8 of the cup-shaped piston member 6 to its uppermost position as shown in FIGURE 4, as a result of which the metered quantity of aerosol composition above the cup-shaped piston member 6 can then be vented to atmosphere through the discharge tube 12, the cup-shaped piston member 6 also moving to its uppermost position, by reason of the pressure differential between the internal pressure in the container and atmospheric pressure aided by the spring 18 beneath the piston member 6. At the conclusion of the upward movement of both the discharge tube 12 and the piston member 6, the discharge tube 12 again enters into sealing engagement with the projection 10 on the base 8 of the cup-shaped piston member 6, thereby sealing any aerosol composition remaining in the metering chamber 1 above the piston member 6 from the outside atmosphere, preventing atmospheric contamination or drying out of the material when the device is not in use.

For providing for a charging of the container with a permanent gas in order to produce the necessary internal pressure, a number of ports 19 are formed in the side wall of the cylindrical metering chamber 1 and a rubber sleeve 20 is disposed around the outside of the metering chamber 1 so as to act as a valve as shown in FIGURE 5. To fill the container with the permanent gas, the gas is forced through the discharge tube 12 so that the sealing rim 7 of the piston member 6 is depressed to a position below the ports 19 whereby the gas fed through the discharge tube 12 can pass out through the ports 19 into the container, the rubber sleeve 20 acting as a one-way valve. It will be appreciated that this construction can also be used for charging the container with a propellant liquid.

The ports 19 may with advantage alternatively be positioned in the wall of the cylindrical metering chamber 1 at a point above the upper limit of travel of the sealing rim 7 of the piston member 6 as specifically indicated in FIGURE 5 thus lessening the risk of damage thereto; this is not, however, essential and the ports 19 may be disposed at a point intermediate the extreme positions of the sealing rim 7 in the chamber 1.

I claim:

1. A dispensing device for delivering metered quantities of an aerosol composition which comprises a cylindrical chamber, adapted to be sealed into the neck of a container, closed at its outer end with respect to the container by an elastic sealing washer and provided with an inlet at its inner end for communication with the interior of the container, a cup-shaped piston member having a laterally resilient rim with the entire periphery thereof sliding directly against a side wall of said cylindrical chamber and disposed to be axially reciprocable therein with its open end towards the outer end thereof, a discharge tube mounted in said sealing washer and extending therethrough to be engageable with the bottom of the piston member and to be sealed thereby, said discharge tube being resiliently biased in an outward direction and being movable axially of the chamber so as first to depress the piston member to a predetermined extent to collect a metered quantity of liquid within the outer part of the cylindrical chamber and thereafter to return outwardly to its initial position while separating from sealing engagement with the piston member whereby the metered quantity of liquid is vented therethrough to atmosphere.

2. A dispensing device according to claim 1 wherein a compression spring is mounted within the chamber beneath the piston member.

3. A dispensing device according to claim 2 wherein the discharge tube is formed on its outer surface with a circumferential recess whose length axially of the discharge tube is greater than the thickness of the sealing washer, to provide a lost-motion connection between the discharge tube and the sealing washer.

References Cited in the file of this patent

UNITED STATES PATENTS

| | | |
|---|---|---|
| 1,037,680 | Spitzenberg | Sept. 3, 1912 |
| 2,514,030 | Coyle et al. | July 4, 1950 |
| 2,693,983 | Howell | Nov. 9, 1954 |
| 2,746,796 | St. Germain | May 22, 1956 |
| 2,835,417 | Kiraly | May 20, 1958 |
| 2,888,173 | Wolcott | May 26, 1959 |
| 2,913,154 | Kuffer | Nov. 17, 1959 |